United States Patent
Singh et al.

(10) Patent No.: US 10,412,682 B2
(45) Date of Patent: Sep. 10, 2019

(54) MECHANISM TO UPDATE/DOWNLOAD PROFILE USING LOW POWER OR NO POWER

(71) Applicant: QUALCOMM Incorporated, San Diego, CA (US)

(72) Inventors: Shyam Singh, Hyderabad (IN); Keemat Rai, Hyderabad (IN); Goutam Motika, Hyderabad (IN); Michele Berionne, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/691,389

(22) Filed: Aug. 30, 2017

(65) Prior Publication Data
US 2019/0069248 A1   Feb. 28, 2019

(51) Int. Cl.
| | | |
|---|---|---|
| *H04W 8/18* | (2009.01) | |
| *H04W 52/02* | (2009.01) | |
| *H04W 76/10* | (2018.01) | |
| *H04W 8/20* | (2009.01) | |
| *H04W 12/04* | (2009.01) | |
| *H04L 29/08* | (2006.01) | |
| *H04W 88/06* | (2009.01) | |

(52) U.S. Cl.
CPC ....... *H04W 52/0296* (2013.01); *H04W 8/205* (2013.01); *H04W 12/04* (2013.01); *H04W 52/0209* (2013.01); *H04W 76/10* (2018.02); *H04L 67/12* (2013.01); *H04W 88/06* (2013.01)

(58) Field of Classification Search
CPC .. H04W 52/0296; H04W 52/02; H04W 76/02
See application file for complete search history.

(56) References Cited

U.S. PATENT DOCUMENTS

| 9,549,313 | B2 | 1/2017 | Park et al. |
|---|---|---|---|
| 9,578,020 | B2 | 2/2017 | Berthet et al. |
| 2008/0261561 | A1 | 10/2008 | Gehrmann et al. |

(Continued)

FOREIGN PATENT DOCUMENTS

| EP | 2938107 A1 | 10/2015 |
|---|---|---|
| WO | 2009017292 A1 | 2/2009 |
| WO | 2014207143 A1 | 12/2014 |

OTHER PUBLICATIONS

International Search Report and Written Opinion—PCT/US2018/042499—ISA/EPO—Sep. 17, 2018.

*Primary Examiner* — Lakeram Jangbahadur
(74) *Attorney, Agent, or Firm* — Arent Fox, LLP and Qualcomm, Incorporated (57) ABSTRACT

In an aspect of the present disclosure, a method, a computer-readable medium, and an apparatus are provided to overcome the deficiencies discussed above. The apparatus may include a frontend component and a storage element. The frontend component may include a processor configured to communicate with a second device and to receive a signal from the second device, the signal providing power to the apparatus and providing profile information. The storage element may be coupled to the frontend component and may be configured to receive the profile information and to store the profile information while powered by the frontend component through the signal from the second device.

24 Claims, 6 Drawing Sheets

(56) References Cited

U.S. PATENT DOCUMENTS

| | | | |
|---|---|---|---|
| 2012/0001725 A1* | 1/2012 | Chen | H04L 63/0492 340/5.6 |
| 2013/0257364 A1* | 10/2013 | Redding | H02J 5/005 320/108 |
| 2014/0357229 A1 | 12/2014 | Lee et al. | |
| 2015/0171930 A1* | 6/2015 | Joehren | H04B 5/0037 455/41.1 |
| 2015/0188322 A1* | 7/2015 | Lee | H02J 7/0052 307/104 |
| 2015/0244424 A1* | 8/2015 | Sung | H04B 5/0037 320/108 |
| 2016/0150400 A1* | 5/2016 | Cha | H04W 8/245 455/418 |
| 2016/0241537 A1 | 8/2016 | Cha et al. | |
| 2016/0285517 A1* | 9/2016 | Kazy | H04B 5/0037 |
| 2016/0301529 A1 | 10/2016 | Park et al. | |
| 2017/0077995 A1* | 3/2017 | Leabman | H04B 5/0037 |
| 2018/0006465 A1 | 1/2018 | Lee et al. | |

\* cited by examiner

MECHANISM TO UPDATE/DOWNLOAD PROFILE USING LOW POWER OR NO POWER

BACKGROUND

Field

The present disclosure relates generally to communication systems, and more particularly, to a mechanism to update or down load a profile using low power or no power.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Example of telecommunications standards include 5G New Radio (NR), 4G Long Term Evolution (LTE), or other Third Generation Partnership Project (3GPP) based standards. While such standards may provide high throughput and data speeds, such standards may also require a significant amount of power, especially on battery sensitive devices such as Internet of Things (IoT) devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A device may receive remote downloads of profile information via a communication link. The profile information may include network information for the device to communicate via services provided by mobile network operators (MNOs) (e.g., Verizon Wireless, AT&T Wireless, Sprint Wireless, etc.) or via non-telecom services such as ticketing systems, payment systems, tracking systems (e.g., for tracking weather, vehicles, humans, etc.), etc. Remote downloads are performed via over the air (OTA) updates/downloads of the profile using ISO 7816 physical protocol which requires the use of a modem. However, in some circumstances, a device may be located outside of a geographic coverage area to receive an OTA update/download or the device may be low on battery power or in a power saving mode (PSM) and therefore unable to receive an OTA update/download.

In an aspect of the present disclosure, a method, a computer-readable medium, and an apparatus are provided to overcome the deficiencies discussed above. The apparatus may include a storage element and a frontend component. The frontend component may be configured to draw power from a second wireless device to power the frontend component and the storage element. The frontend component may also be configured to download profile information from the second wireless device. The frontend component may further be configured to transfer the profile information from the frontend component to the storage element.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. The apparatus and methods will be described in the following detailed description and illustrated in the accompanying drawings by various blocks, components, circuits, processes, algorithms, etc. (collectively referred to as "elements"). The elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage elements, combinations of the aforementioned types of computer-readable media, or any other medium that can be used to store computer executable code in the form of instructions or data structures that can be accessed by a computer.

Figure 1:
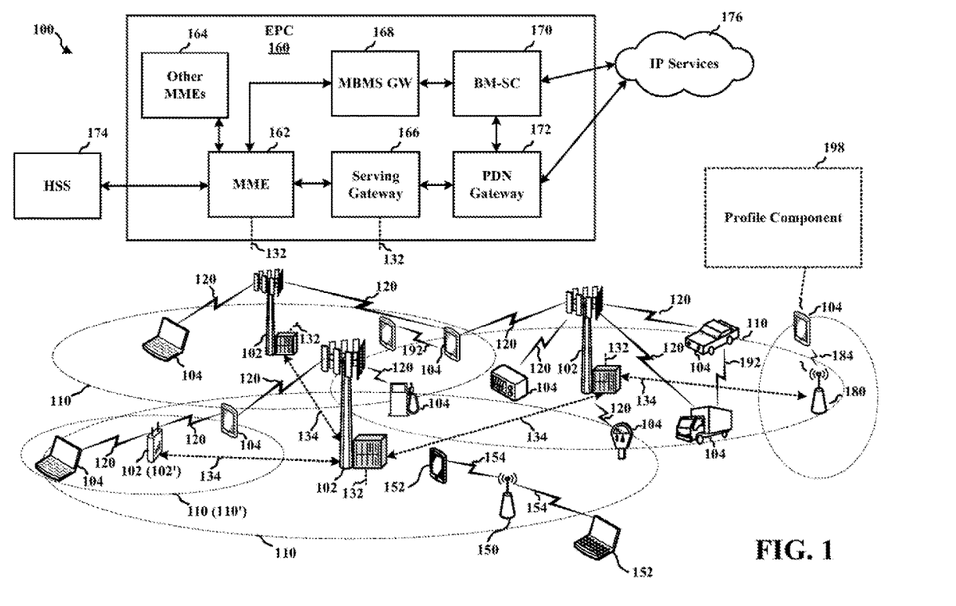
FIG. 1 is a diagram illustrating an example of a wireless communications system and an access network.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, Near Field Communication (NFC), or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices, such as wearables (e.g., watch or sports band), parking meter, gas pump, toaster, vehicles, sensing devices (e.g., rain/temperature sensors), tracking devices (e.g., animal, prisoner, or automobile tracking device), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to include a profile component 198. The profile component 198 may be configured to draw power from a second wireless device (e.g., another UE) to power a frontend component and a storage element of the UE 104. The profile component 198 may also be configured to download profile information from the second wireless device. The profile component 198 may further be configured to transfer the profile information to the storage element.

Figure 2:
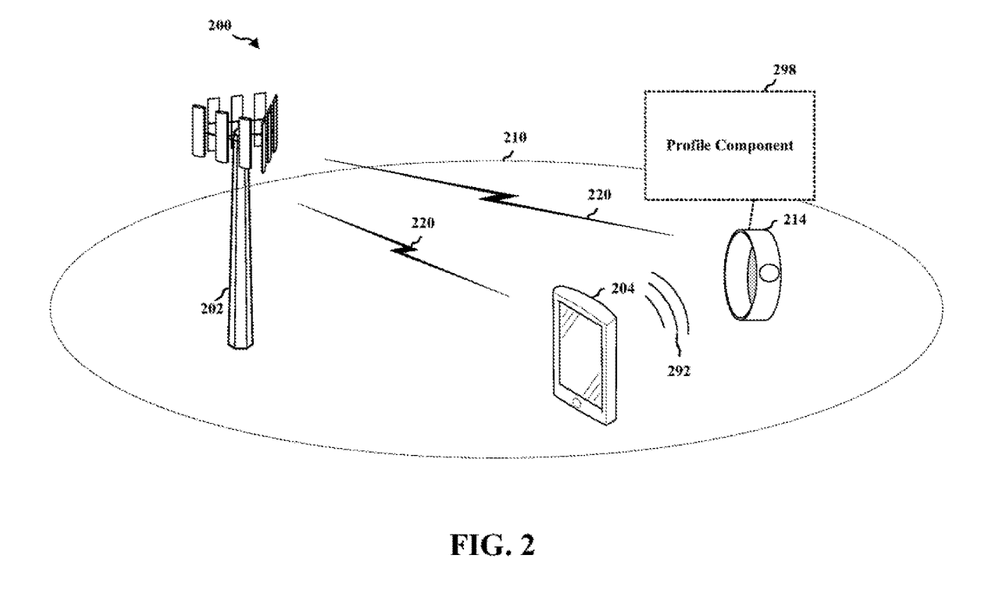
FIG. 2 is a diagram illustrating an example of a wireless communication system.

FIG. 2 is a diagram 200 illustrating an example of a wireless communication system according to exemplary embodiments of the present disclosure. The system may include a base station 202. An example of the base station 202 may include the base station 102, the small cell 102', the access point 150, or the gNB 180, described supra. The base station 202 may be configured to directly communicate with devices located within the geographic coverage area 210. As shown by FIG. 2, the base station 202 may communicate with a UE 204 and a IoT device 214. An example of the UE 204 and the IoT device 214 may include the UEs 104 described supra. The communication links 120 between the base station 202 and the UE 204 and the IoT device 214 may include UL and DL transmissions based on a NR, LTE, or other 3GPP based transmissions, or IEEE 802.11 based standards. In this example, both the UE 204 and the IoT device 214 may be configured to communicate with each other via a D2D communication link 292. An Example of the communication link 220 may include the communication link 120, such as a cellular communication link, as described supra. An example of the D2D communication link 292 may include an NFC link or the D2D communication link 192, as described supra.

The IoT device 214 may include a storage element which may be an integrated circuit. Examples of the storage element may include secure storage element such as a subscriber identification module (SIM), an embedded SIM (eSIM), a universal integrated circuit card (UICC), or an embedded UICC (eUICC). The storage element may be configured with information including device information and profile information. The device information may include unique numbers related to the storage element and the device. Examples of the device information may include an integrated circuit card identifier (ICCID) and an international mobile subscriber identity (IMSI) number. The profile information may include information for a device to communicate via services provided by mobile network operators (MNOs) (e.g., Verizon Wireless, AT&T Wireless, Sprint Wireless, etc.) or via non-telecom services such as ticketing systems, payment systems, tracking systems (e.g., for tracking weather, vehicles, humans, etc.), etc. and may also include security authentication and ciphering information to access these services. In this example, the IoT device 214 may be configured to communicate with one or more of the services providers and therefore may be configured to store profile information for each of the one or more service providers. Updating or downloading profile information for the IoT device 214 may be performed by an over the air (OTA) update/download via communication link 220. The OTA update/download allows a service provider to remotely provision and manage a profile and to a subscription to the service provider. For example, the IOT device 214 may be configured to receive remote updates of profile information via communication link 220 from a service provider (e.g., Verizon Wireless). In another example, the IoT device 214 may be configured to receive remote downloads of profile information via the communication link 220 when switching from a first service provider (e.g., Verizon Wireless) to a second service provider (e.g., Sprint Wireless). OTA updates/downloads of profile information are performed using ISO 7816 physical protocol. Under the ISO7816 physical protocol, a modem of the device being updated (e.g., IoT device 214) is powered up to transfer data from the base station 202. In doing so, battery charge of a battery in the IoT device 214 may be depleted while receiving the profile information and performing the update or any changes to the IoT device 214, which in turn may reduce the operating time of the IoT device on battery power. Further, OTA updates/downloads of profile information require the IoT device 214 to be within the geographic coverage area 210 of the service provider with which the IoT device 214 receives service.

In some circumstances the IoT device 214 may be remotely located (i.e., out of the geographic coverage area 210) and/or may be low on battery power or in a power saving mode (PSM)/low power mode and therefore unable to receive an OTA update/download. Accordingly, allowing the IoT device 214 to perform an update/download of profile information without the use of communication link 220 or without using the ISO 7816 physical protocol may be desirable.

As shown by FIG. 2, the UE 204 may be configured to download profile information and provide the profile information to the IoT device 214. In this example, the UE 204 may communicate with the IoT device 214 via D2D communication link 292. The IoT device 214 may be configured to include a profile component 298. The profile component 298 may be configured to draw power from the UE 204 to power a frontend component and a storage element of the IoT device 214. The profile component 298 may also be configured to download profile information from the UE 204. The profile component 298 may further be configured to transfer the profile information to the storage element.

Figure 3:
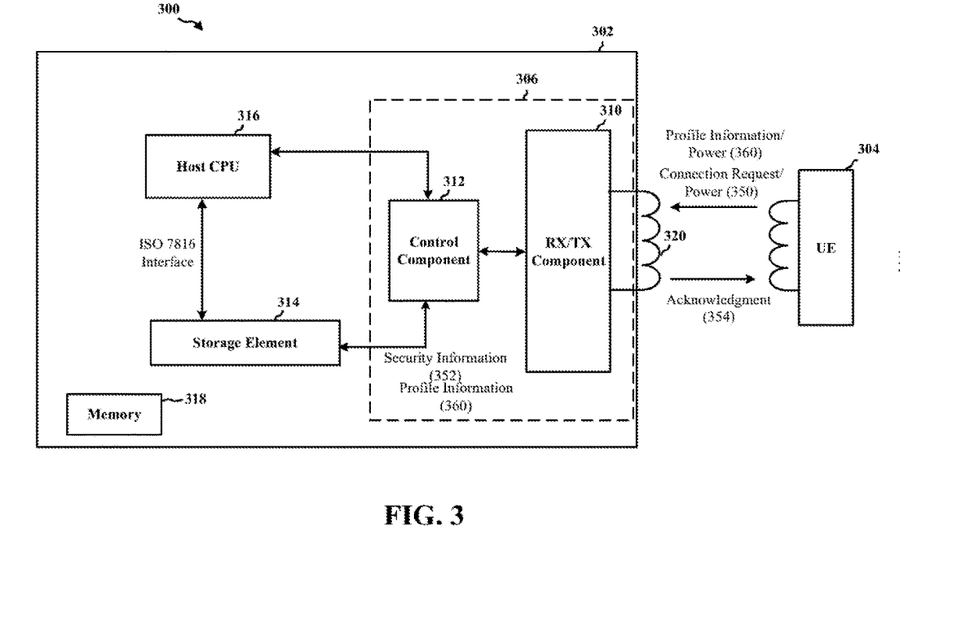
FIG. 3 is a block diagram of conceptual design of profile information being updated/downloaded by a device.

FIG. 3 is a block diagram 300 of conceptual design of a profile being updated/downloaded by an IoT device 302. Examples of the IoT device 302 may include the UE 104 or the IoT device 214. In this example, the UE 304 may provide profile information to the IoT device 214. Examples of the UE 304 may include the UEs 104, 204.

The IoT device 302 may include a frontend 306 configured to communicate with the UE 304. The frontend 306 may include an RX/TX component 310 and a control component 312. The RX/TX component 310 may be configured to receive a connection request, authentication information, and power, and provide the authentication information to the control component 312. In an aspect, the frontend 306 may be a contactless frontend, such as an electromagnetic inductor used by NFC. In this example, the RX/TX component 310 may include a coupling coil 320 configured to communicate with the UE 304. The coupling coil 320 may be configured to receive power and transmit/receive data through electromagnetic inductance, as described infra.

Before, or while, communicating with the IoT device 302, the UE 304 may receive the profile information from a network system (not shown). The UE 304 and the IoT device 302 may communicate with each other via a communication link. When initiating the communication link, the IoT device 302 may receive a request to connect (i.e., a connection request) with the IoT device 302 (350). The request to connect may include request information indicating that the UE 304 is requesting a connection to perform an update/download of the profile information. The request may also include authentication information for authenticating that the UE 304 may provide profile information to the IoT device 302. The authentication information may include unique information associated with the UE 304, such as an ICCID or an IMSI number of the UE 304, an identification key, or a certificate. Further, the request may include power from the UE 304 to the IoT device 302, such that that the IoT device 302 may perform authentication while in a low power state.

The control component 312, may be configured to accept communication with the UE 304 by transmitting an acknowledgment 354 to the UE 304. In an aspect the control component 312 may validate the authentication information before transmitting the acknowledgment 354. A validation process may include the control component 312 obtaining security information stored on the IoT device 302. In an example, the security information may include a list of identifications corresponding to devices authorized to connect with the IoT device 302 for a profile update/download process. The control component 312 may request and obtain the security information 352 from a storage element 314. However, in another example, the control component 312 may obtain the security information 352 from other memory components (e.g., 318) or by other methods such as a request to the host CPU 316 to obtain the security information 352 from memory 318. The control component 312 may then attempt to validate the authentication information by comparing the authentication information with the security information stored on the IoT device 302. For example, the IoT device 302 may compare the authentication information (e.g., an ICCID of the UE 304) with the identifications of authorized devices listed in the security information to determine whether the UE 304 is an authorized device for updating/downloading profile. If the security information 352 is not valid, the control component 312 may end communication with the UE 304. If the authentication information is valid, the control component 312 may transmit an acknowledgment or connection accept message to the UE 304 to establish a communication link (354). Once the connection request is validated, the IoT device 302 may enable the storage element 314 to be written to.

Once an acknowledgement has been received, the IoT device 302 may communicate with the UE 304 and receive a signal from the UE 304 (360). The signal may include power to the frontend 306 and provide profile information for the IoT device 302 to download. The profile information may include updated service provider information, such as subscription information, to be used by the IoT device 302 for updating a service provider profile currently used by or stored on the IoT device 302. In another example, the profile information may include new service provider information corresponding to a service provider profile not stored on the IoT device 302. The new service provider information may be used to change subscription services from a first service provider to a second service provider.

The control component 312 may receive and download the profile information and send the profile information to a storage element 314, which is configured to receive the profile information and to store the profile while powered by the frontend through the signal from the UE 304.

In an aspect, the frontend 306 may communicate with the storage element 314 via an NFC protocol such as a single wire protocol. The single wire protocol may be used to communicate all data, including the profile information, between the control component 312 and the storage element 314.

In some aspects, the frontend 306 may be configured to receive the signal from the UE 304 while the IoT 302 is in a PSM. In this example, the power received from the UE 304 may provide enough power to the IoT device 302 to at least power a minimum number of components for downloading the profile information and updating, or installing, the profile information. The minimum number of components may include at least the frontend 306 and the storage element 314, however, in other embodiments, additional components such as the host CPU 316 or the memory 318 may be powered during an profile update/install process. As described supra, the power may be transferred from the UE 304 to the IoT device 302 via the coupling coil 320. Using the coupling coil 320, the IoT device 302 may obtain power through electromagnetic inductance to activate the frontend 306 and enable the storage element 314 for performing authentication and for updating/downloading profile processes.

In some aspects, the frontend component 306 may be configured to receive the profile information from the UE 304 while the IoT 302 is in a low power mode. In this example, the IoT 302 does not draw power from the UE 304. Instead, the IoT 302 uses a battery power in the IoT 302 to power at least the minimum number of components. In this example, the control component 312 may determine whether to draw power from the UE 304 or use battery power from the IoT 302. For example, the control component 312 may determine to use battery power from the IoT 302, instead of drawing power from the UE 304, when a battery charge level is at or above a predetermine amount.

Figure 4:
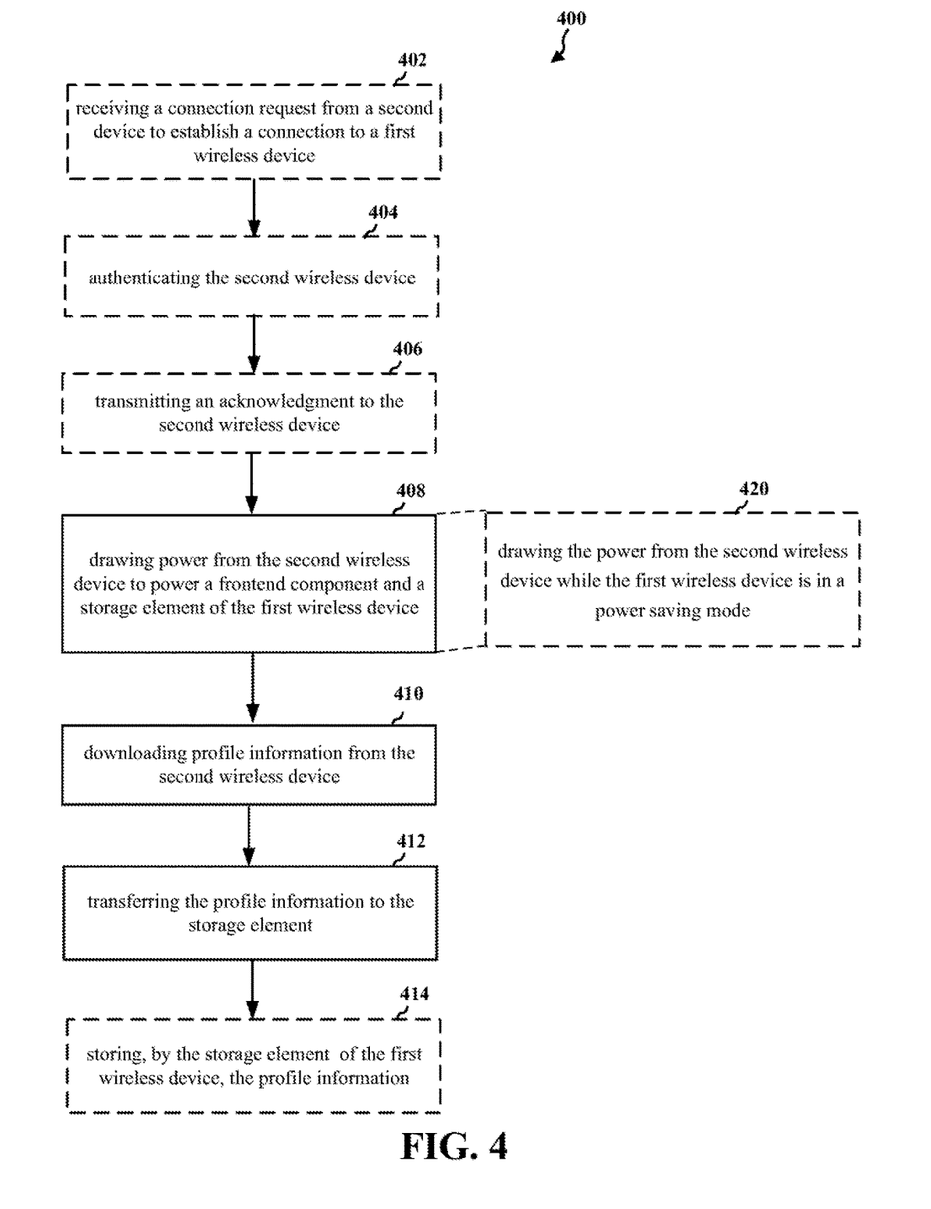
FIG. 4 is a flowchart of a method of wireless communication.

FIG. 4 is a flowchart 400 of a method of wireless communication updating/downloading a profile of a wireless device. The method may be performed by a UE, such as 104, 204, 214, 302. At block 402, the apparatus may receive a connection request from the second device to establish a connection to the first wireless device. The connection request may include request information indicating that the second wireless device is requesting to perform an update/download of the profile information. The request may also include authentication information for authenticating that the second wireless device may provide profile information to the apparatus. The authentication information may include unique information associated with the second wireless device, such as an ICCID or an IMSI number of the second wireless device, an identification key, or a certificate. Further, the request may include power from the second wireless device to the apparatus, such that that the apparatus may be powered to receive the request.

At block 404, the apparatus may authenticate the second wireless device. In an aspect the apparatus may validate the authentication information before transmitting the acknowledgment. A validation process may include the apparatus obtaining security information stored on the apparatus. In an example, the security information may include a list of devices authorized to connect with the apparatus for a profile update/download process. For example, the apparatus may request and obtain the security information from a storage element in the apparatus. However, in another example, the apparatus may obtain the security information from other memory components or by other methods such as a request to the host CPU of the apparatus to obtain the security information from memory. The apparatus may then attempt to validate the authentication information by comparing the authentication information with the security information stored on the apparatus. For example, the apparatus may compare the authentication information with the corresponding security information in a list of authorized devices to determine whether the second wireless device is an authorized device for updating/downloading profile. If the security information is not valid, the apparatus may end communication with the second wireless device. If the authentication information is valid, the apparatus may, at 406, transmit an acknowledgment or connection accept message to the second wireless device to establish a communication link.

At 408, the apparatus may draw power from the second wireless device to power a frontend component and a storage element of the apparatus. In an example the apparatus may draw power from the second wireless device to power the host CPU and memory components of the apparatus.

In some aspects, the apparatus may, at 420, draw the power from the second wireless device while the apparatus is in a power saving mode/low power mode. In this example, the apparatus may use power from the second wireless device to perform all functions of the update/downloading of the profile information without using battery power of the apparatus.

At 410, the apparatus may download the profile information from the second wireless device. In an example, the frontend of the apparatus may receive the profile information from the second wireless device while being powered by the second wireless device. In an aspect, the frontend may be a contactless frontend, such as an electromagnetic inductor used by NFC, and the download of the profile information may be received over the electromagnetic inductor along with the power from the second wireless device.

At 412, the apparatus may transfer the profile information to the storage element. In an aspect, the frontend electrically couples to the storage element via a single wire protocol. The single wire protocol may be used to communicate all data, including the profile information, between the frontend and the storage element.

At 414, the storage element of the apparatus may store the profile information. The profile information may include updated service provider information, such as subscription information, to be used by the apparatus for updating a service provider profile currently used by or stored on the apparatus. In another example, the profile information may include new service provider information corresponding to a service provider profile not stored on the apparatus. The new service provider information may be used to change subscription services from a first service provider to a second service provider.

In some aspects, the frontend component is a contactless frontend component configured to wirelessly communicate with the second wireless device. In some aspects, the storage element is a secure storage element such as a SIM configured to store the profile information including profiles regarding one or more service providers. In some aspects, the storage element is an embedded universal integrated circuit card (eUICC).

Figure 5:
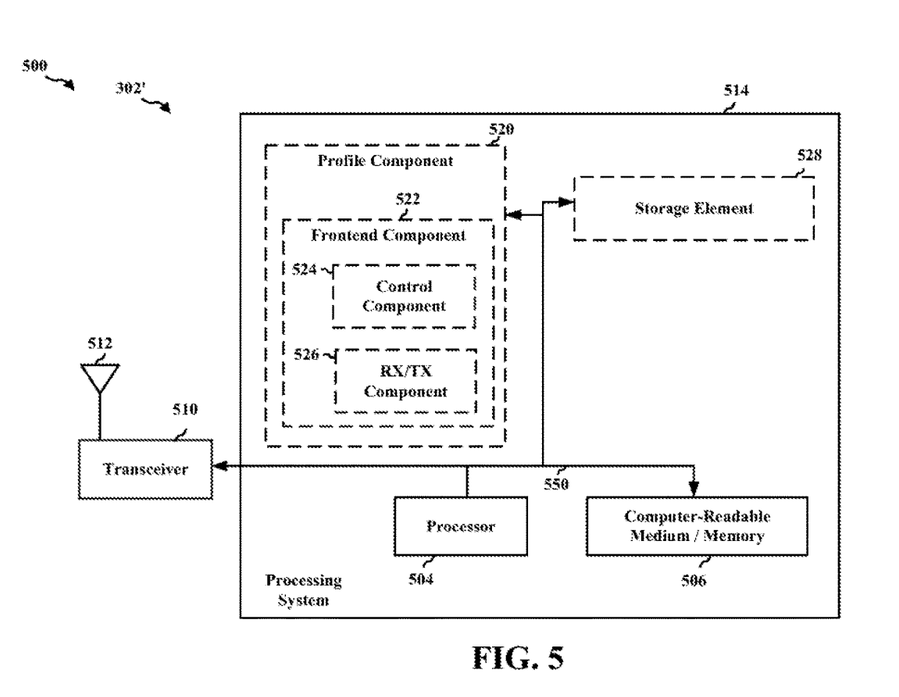
FIG. 5 is a diagram illustrating an example of a hardware implementation for an apparatus employing a processing system.

FIG. 5 is a diagram 500 illustrating an example of a hardware implementation for an apparatus 302' employing a processing system 514. Examples of the apparatus 302' may be include the UE 104 or IoT devices 214, 302, 304. The processing system 514 may be implemented with a bus architecture, represented generally by the bus 550. The bus 550 may include any number of interconnecting buses and bridges depending on the specific application of the processing system 514 and the overall design constraints. The bus 550 links together various circuits including one or more processors and/or hardware components, represented by the processor 504, the components 520-528, and the computer-readable medium/memory 506. The bus 550 may also link various other circuits such as timing sources, peripherals, voltage regulators, and power management circuits, which are well known in the art, and therefore, will not be described any further.

The processing system 514 may be coupled to a transceiver 510. The transceiver 510 is coupled to one or more antennas 512. The transceiver 510 provides a means for communicating with various other apparatus over a transmission medium. The transceiver 510 receives a signal from the one or more antennas 512, extracts information from the received signal, and provides the extracted information to the processing system 514. In addition, the transceiver 510 receives information from the processing system 514 and based on the received information, generates a signal to be applied to the one or more antennas 512. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes at least one of the components 520-528. The components may be software components running in the processor 504, resident/stored in the computer readable medium/memory 506, one or more hardware components coupled to the processor 504, or some combination thereof. The processing system 514 may be a component of the UE 104, 204, 214, or 302.

In one configuration, the apparatus 302' for wireless communication may include means for drawing power from a second wireless device to power a frontend component and a storage element of the apparatus 302'. The apparatus 302' may also include means for downloading profile information from the second wireless device. Further, the apparatus 302' may include means for transferring the profile information to the storage element.

In some aspects, the apparatus 302' may include means for receiving a connection request from the second device to establish a connection to the apparatus 302'. In some aspects, the apparatus 302' may include means for authenticating the second wireless device, wherein the means for downloading the profile information from the second wireless device waits for the second wireless device has been authenticated before downloading the profile information.

In some aspects, the frontend component electrically couples to the storage element via a single wire protocol configured to transfer the profile information from the frontend component to the storage element.

In some aspects, the frontend component is a contactless frontend component configured to wirelessly draw the power and receive the profile information from the second wireless device.

In some aspects, the means for drawing the power from the second wireless device is configured to draw the power from the second wireless device while the apparatus is in a PSM.

In some aspects, the storage element is a SIM configured to store the profile information and wherein the profile information includes at least one profile of a service provider. In yet another aspect, the storage element is an embedded universal integrated circuit card (eUICC).

The aforementioned means may be one or more of the aforementioned components of the apparatus 302' configured to perform the functions recited by the aforementioned means. The processing system 514 may include the frontend component 306, the RX/TX component 310, the control component 312, the storage element 314, the host processor 316, and the memory 318. As such, in one configuration, the aforementioned means may be the frontend component 306, the RX/TX component 310, the control component 312, the storage element 314, the host processor 316, and the memory 318 configured to perform the functions recited by the aforementioned means.

Figure 6:
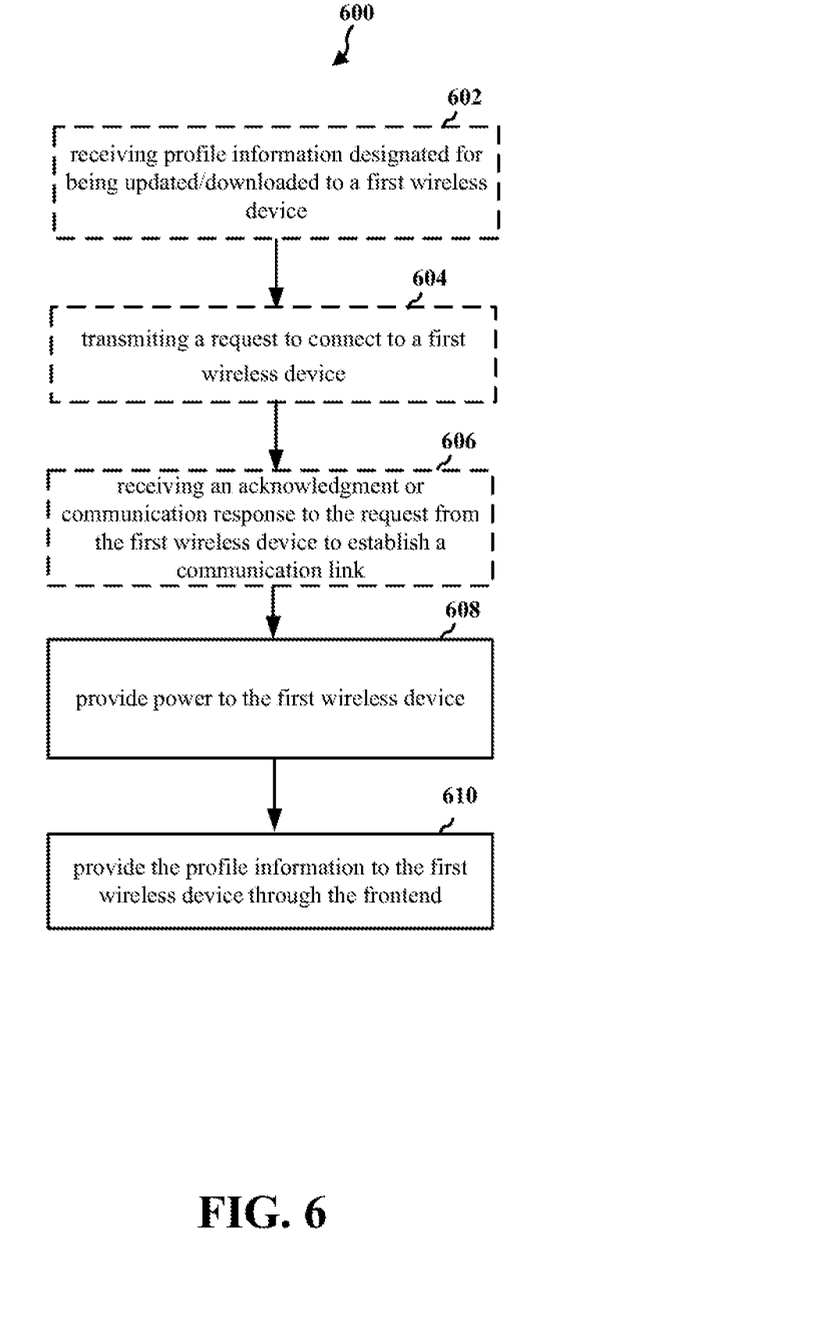
FIG. 6 is a flowchart of a method of wireless communication transmitting a profile of a wireless device.

FIG. 6 is a flowchart 600 of a method of wireless communication for transmitting a profile to a wireless device. The method may be performed by an apparatus, such as UEs 104, 204, 214, 302, 304. The functional components used in describing the IoT 302 will be used to describe the apparatus. At block 602, the apparatus may receive profile information designated for being updated/downloaded to a first wireless device. In an aspect, the apparatus may receive the profile information through an ISO 7816 interface (see e.g., ISO 7816 interface between host CPU 316 and storage element 314). For example, the apparatus may receive the profile information from a service provider over a cellular connection. However, the present disclosure is not limited to only this method as other methods including downloading of the profile information through any wired means, such as connection to another device, or wireless means such as connection through to an NFC device, may be used. Further, the profile information may be stored in the storage element 314 or the memory 318.

At block 604, the apparatus may transmit a request to connect to a first wireless device. The request to connect may include request information indicating that the apparatus is requesting to perform an update/download of the profile information. The request may also include authentication information for authenticating that the apparatus is authorized to provide/update the profile information of the first wireless devices. The authentication information may include unique information associated with the apparatus, such as an ICCID or an IMSI number of the apparatus, an identification key, or a certificate. Further, the apparatus may transmit power to the first wireless device during a connect request, such that that the first wireless device may be powered to receive the request.

At block 606, the apparatus may receive an acknowledgment or connection acceptance message to the request from the first wireless device to establish a communication link.

At block 608, the apparatus may provide power to the first wireless device. The power may be provided to the frontend component (e.g., 306). In an example, the frontend component may include a coupling coil (e.g., 310) for connecting to the first wireless device. The coupling coil may be configured to provide the power and data to the first wireless device.

At block 610, the apparatus may provide the profile information to the first wireless device through the frontend.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a first device, comprising:
   receiving a connection request from a second device to establish a connection to the first device, wherein the receiving the connection request comprises authenticating the second device, and
      downloading profile information from the second device when the second device has been authenticated;
   drawing power from the second device to power a frontend component and a storage element of the first device;
   downloading the profile information from the second device while drawing power from the second device; and
   transferring the profile information to the storage element, wherein the frontend component electrically couples to the storage element via a single wire protocol configured to transfer the profile information from the frontend component to the storage element.

2. The method of claim 1, wherein the frontend component is a contactless frontend component configured to wirelessly draw the power and receive the profile information from the second device.

3. The method of claim 1, wherein the drawing the power from the second device comprises drawing the power from the second device while the first device is in a power saving mode.

4. The method of claim 1, wherein the storage element is a subscriber identification module (SIM) configured to store the profile information and wherein the profile information includes at least one profile of a service provider.

5. The method of claim 1, wherein the storage element is an embedded universal integrated circuit card (eUICC).

6. An apparatus for wireless communication, comprising:
   means for receiving a connection request from a second device to establish a connection to the apparatus, wherein the means for receiving the connection request is configured to
      authenticate the second device, and
      download profile information from the second device when the second device has been authenticated;
   means for drawing power from the second device to power a frontend component and a storage element of the apparatus;
   means for downloading the profile information from the second device while drawing power from the second device; and
   means for transferring the profile information to the storage element, wherein the frontend component electrically couples to the storage element via a single wire protocol configured to transfer the profile information from the frontend component to the storage element.

7. The apparatus of claim 6, wherein the frontend component is a contactless frontend component configured to wirelessly draw the power and receive the profile information from the second device.

8. The apparatus of claim 6, wherein the means for drawing the power from the second device is configured to draw the power from the second device while the apparatus is in a power saving mode.

9. The apparatus of claim 6, wherein the storage element is a subscriber identification module (SIM) configured to store the profile information and wherein the profile information includes at least one profile of a service provider.

10. The apparatus of claim 6, wherein the storage element is an embedded universal integrated circuit card (eUICC).

11. An apparatus for wireless communication, comprising:
    a storage element; and
    a frontend component configured to:
      receive a connection request from a second device to establish a connection to the apparatus;
      authenticate the second device;
      download profile information from the second device when the second device has been authenticated;
      draw power from the second device to power the frontend component and the storage element;
      download the profile information from the second device while drawing power from the second device; and
      transfer the profile information from the frontend component to the storage element, wherein the frontend component electrically couples to the storage element via a single wire protocol configured to transfer the profile information from the frontend component to the storage element.

12. The apparatus of claim 11, wherein the frontend component is a contactless frontend component configured to wirelessly draw the power and receive the profile information from the second device.

13. The apparatus of claim 11, wherein the frontend component is further configured to draw the power from the second device while the apparatus is in a power saving mode.

14. The apparatus of claim 11, wherein the storage element is a subscriber identification module (SIM) configured to store the profile information and wherein the profile information includes at least one profile of a service provider.

15. The apparatus of claim 11, wherein the storage element is an embedded universal integrated circuit card (eUICC).

16. A non-transitory computer-readable medium storing computer executable code for a first device, comprising code for:
    receiving a connection request from a second device to establish a connection to the first device;
    authenticating the second device;

downloading profile information from the second device when the second device has been authenticated;

drawing power from the second device to power a frontend component and a storage element of the first device;

downloading the profile information from the second device while drawing power from the second device; and transferring the profile information to the storage element, wherein the frontend component electrically couples to the storage element via a single wire protocol configured to transfer the profile information from the frontend component to the storage element.

17. The non-transitory computer-readable medium of claim 16, wherein the frontend component is a contactless frontend component configured to wirelessly draw the power and receive the profile information from the second device.

18. The non-transitory computer-readable medium of claim 16, further comprising code for drawing the power from the second device while the first device is in a power saving mode.

19. The non-transitory computer-readable medium of claim 16, wherein the storage element is a subscriber identification module (SIM) configured to store the profile information and wherein the profile information includes at least one profile of a service provider.

20. The non-transitory computer-readable medium of claim 16, wherein the storage element is an embedded universal integrated circuit card (eUICC).

21. A method of wireless communication by a first device, comprising:
receiving a connection request from a second device to establish a connection to the first device, wherein the receiving the connection request comprises
authenticating the second device, and
downloading profile information from the second device when the second device has been authenticated;
receiving a signal from the second device, by a frontend component, while the first device is in a low power mode prior to drawing power from the second device;
downloading the profile information from the second device while drawing power from the second device; and
transferring the profile information to a storage element electrically coupled to the frontend component, wherein the frontend component electrically couples to the storage element via a single wire protocol configured to transfer the profile information from the frontend component to the storage element.

22. An apparatus for wireless communication, comprising:
means for receiving a connection request from a second device to establish a connection to the apparatus, wherein the means for receiving the connection request is configured to
authenticate the second device, and
download profile information from the second device when the second device has been authenticated;
means for receiving a signal from the second device, by a frontend component, while the first device is in a low power mode prior to drawing power from the second device;
means for downloading the profile information from the second device while drawing power from the second device; and
means for transferring the profile information to a storage element electrically coupled to the frontend component, wherein the frontend component electrically couples to the storage element via a single wire protocol configured to transfer the profile information from the frontend component to the storage element.

23. An apparatus for wireless communication, comprising:
a storage element; and
a frontend component electrically coupled to the storage element and configured to:
receive a connection request from a second device to establish a connection to the apparatus;
authenticate the second device;
download the profile information from the second device when the second device has been authenticated;
receive a signal from the second device while the apparatus is in a low power mode prior to drawing power from the second device;
download the profile information from the second device while drawing power from the second device; and
transfer the profile information from the frontend component to the storage element, wherein the frontend component electrically couples to the storage element via a single wire protocol configured to transfer the profile information from the frontend component to the storage element.

24. A non-transitory computer-readable medium storing computer executable code for a first device, comprising code for:
receiving a connection request from a second device to establish a connection to the first device;
authenticating the second device;
downloading profile information from the second device when the second device has been authenticated;
receiving a signal from the second device, by a frontend component, while the first device is in a low power mode prior to drawing power from the second device;
downloading the profile information from the second device while drawing power from the second device; and
transferring the profile information to a storage element electrically coupled to the frontend component, wherein the frontend component electrically couples to the storage element via a single wire protocol configured to transfer the profile information from the frontend component to the storage element.

* * * * *